United States Patent [19]

Brems

[11] Patent Number: 4,545,266
[45] Date of Patent: Oct. 8, 1985

[54] STRAIGHT LINE LINKAGE
[76] Inventor: John H. Brems, 2800 S. Ocean Blvd.-Apt. 16-D, Boca Raton, Fla. 33432
[21] Appl. No.: 399,465
[22] Filed: Jul. 19, 1982
[51] Int. Cl.[4] .............................................. F16H 21/44
[52] U.S. Cl. ..................................... 74/103; 33/32 R
[58] Field of Search ....................... 74/103, 105, 106; 33/32 R, 32 B, 32 C, 1 LE

[56] References Cited
U.S. PATENT DOCUMENTS
2,198,635  4/1940  Rossman ................................. 74/103

FOREIGN PATENT DOCUMENTS
896291  1/1982  U.S.S.R. ................................ 74/103

OTHER PUBLICATIONS
"Ingenious Mechanisms for Designers and Inventors", vol. II, The Industrial Press, New York, N.Y., 1965, pp. 395-398.
"5 Graphical Methods for Designing Four-Bar Linkages", Product Engineering, Apr. 4, 1960, pp. 37–47.
"5 Linkages for Straight-Line Motion", Product Engineering, Oct. 12, 1959.

Primary Examiner—Kenneth J. Dorner
Attorney, Agent, or Firm—Barnes, Kisselle, Raisch, Choate, Whittemore & Hulbert

[57] ABSTRACT

A mechanical linkage system for generating a straight line and useful as a guidance mechanism utilizing links which do not cross-over in the motion generated. A rigid bellcrank member has a centerpivot connection to a first suspension link, a second pivot connection to a substantially linear guide mechanism, and a third pivot connection to an output point, the dimensions of said link, the distance between said center pivot connection and said guide mechanism, and between said center pivot and said output point are generally equal. The guide mechanism can be a linear slide or a straight line linkage.

8 Claims, 14 Drawing Figures

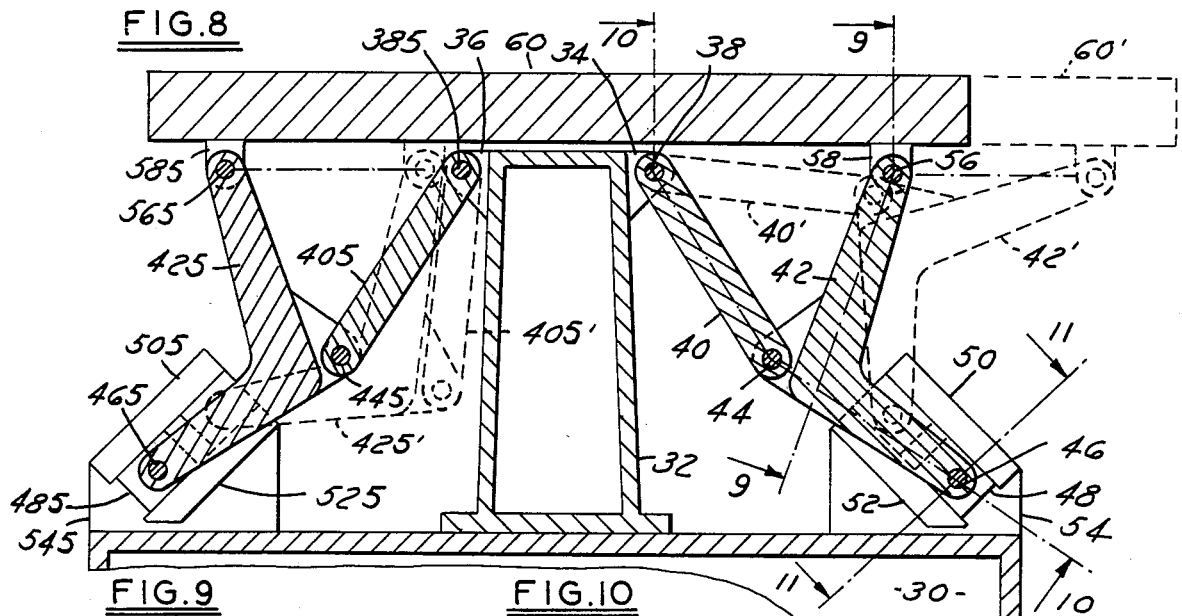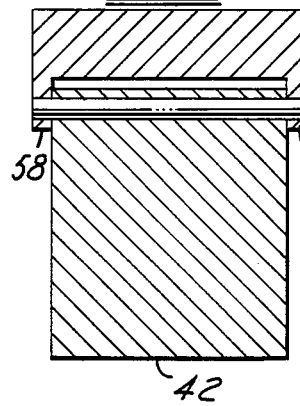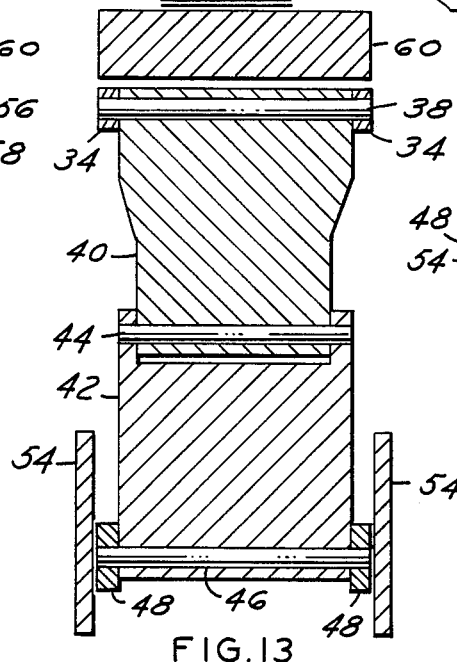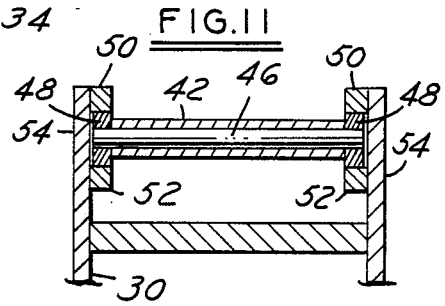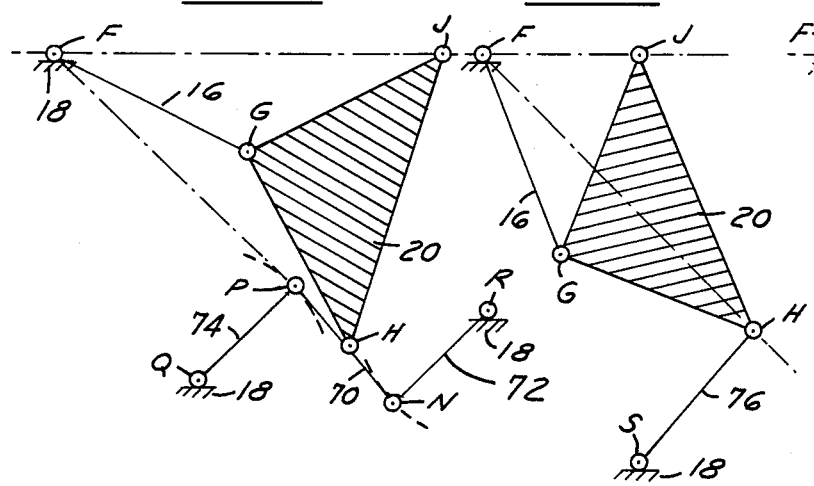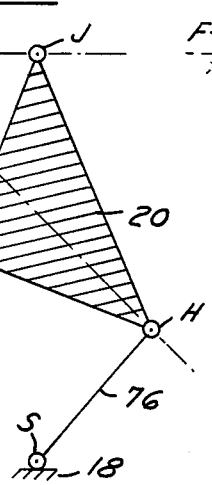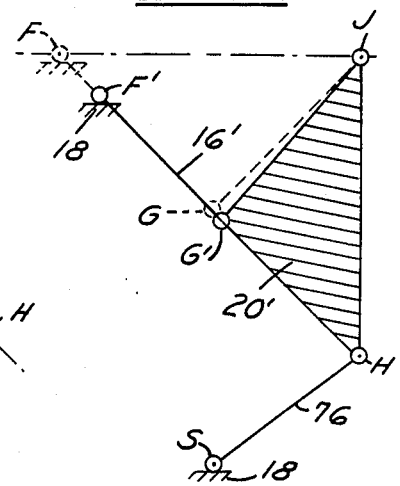

STRAIGHT LINE LINKAGE

FIELD OF INVENTION

Mechanical linkage mechanisms for generating a straight line.

BACKGROUND OF INVENTION

Linkage mechanisms for generating true or approximate straight lines have been utilized as guidance mechanisms for many years. Among the more widely used mechanisms of this type is the Scott Russell mechanism. However, in applications in which there is side loading on the system in a direction transverse to the generated straight line, the Scott Russell mechanism is handicapped since, in this mechanism, the links pass over each other, making it difficult to provide a construction which is capable of reacting transverse loads.

It is one object of this invention to provide a simple mechanism to generate a true or approximate straight line in which the links do not cross over, and it is practical to utilize wide links having widely separated journals on each operating axis, thereby creating a structural arrangement capable of reacting large loads transverse to the direction of motion.

Known linkages for generating straight lines are generally large relative to the length of straight line they are capable of generating. It is another object of this invention to devise a simple linkage which is small and compact relative to the length of the straight line it is capable of generating.

Other objects and features of the invention will be apparent in the following description and claims in which the principles of the invention are set forth together with the details of a representative structure which will enable a machine builder to utilize the invention, all in connection with the best modes presently contemplated for the practice of the invention.

BRIEF DESCRIPTION OF THE DRAWINGS

DRAWINGS accompany the disclosure and the various views thereof may be briefly described as follows:

FIG. 8 is a longitudinal cross-section through a mechanism utilizing two linkages of this invention;

FIG. 9 is a section taken on line 9—9 of FIG. 8;

FIG. 10 is a section taken on line 10—10 of FIG. 8;

FIG. 11 is a section taken on line 11—11 of FIG. 8;

FIG. 12 is a schematic drawing of another embodiment of this invention in which point H is guided by the known Watts linkage;

FIG. 13 is a schematic drawing of another embodiment of this invention in which the point H is guided by a simple link; and FIG. 14 a schematic drawing of another embodiment of this invention in which the ideal proportions are slightly altered.

FIG. 1 is a schematic diagram of the old and well-known Isosceles Sliding Block Linkage. A link 2 is connected to a frame 4 through a pivot point A; this link 2 is connected through a pivot point B to the midpoint of a second link 6. One end of the link 6 is connected to a slider block 8 through the pivot point C. The slider block 8 is constrained to straight line movement along a centerline passing through points C and A by guides 10 mounted to the frame 4. The outboard end, point D, on link 6 will move along a perfect straight line 12, passing through point A and perpendicular to the centerline passing through points A and C, as link 2 is rotated about point A, provided that the distances between A and B, B and C, and B and D are all equal. This is easily proven since the triangles ABC and ABD are each isosceles for any position of the linkage.

FIG. 2 is a schematic diagram of the Scott Russell mechanism for generating an approximate straight line for the path of point D, and is also well known. It is identical with the mechanism of FIG. 1 except that point C, instead of being guided by a slider block, is guided by an oscillating link 14, which is pivotally connected to the link 6 through pivot point C and connected to the frame 4 at pivot point E. The link 14, at the approximate midpoint of its travel, should be perpendicular to the centerline passing through points A and C. It can be seen that the point C moves through an arcuate path, rather than the straight line illustrated in FIG. 1. This causes the path of point D to vary slightly from a perfect straight line. The longer the length of link 14, the flatter is the arcuate path of point C, and the more nearly the path of point D approaches a true straight line; and, if link 14 were infinitely long, the path of point D would again be a true straight line.

Figure 1:
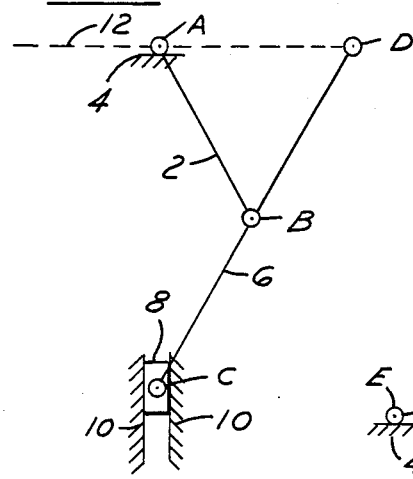
FIG. 1 is a schematic drawing of the known Isosceles Sliding Block Linkage.
Figure 2:
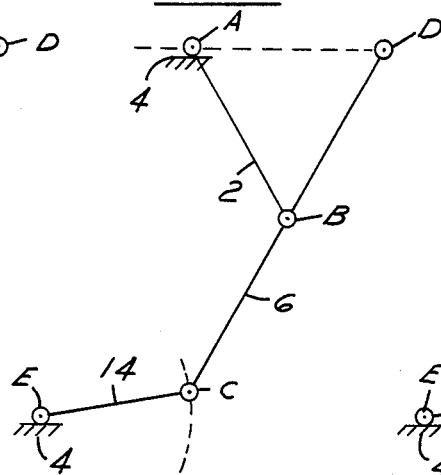
FIG. 2 is a schematic drawing of the known Scott Russell linkage.
Figure 3:
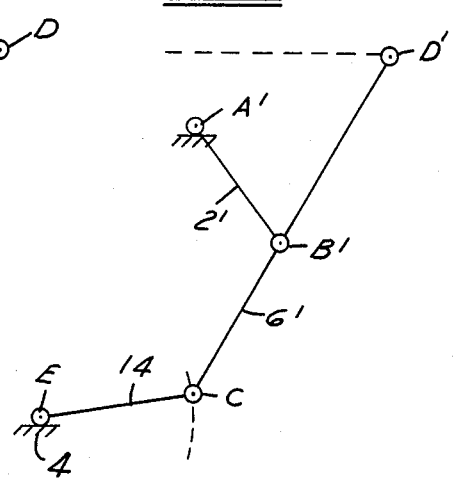
FIG. 3 is a schematic drawing of a known variation of the Scott Russell type linkage.

In the mechanisms of both FIGS. 1 and 2, the path of point D passes through point A which may be structurally inconvenient for a physical mechanism. The mechanism of FIG. 3 illustrates another well-known technique for moving point A out of the path of point D. Point A is moved to point A' and the linkage length ratios are modified such that:

$$\frac{A'B'}{B'C} = \frac{B'C}{B'D}$$

This shortening of the link A'B' to less than one-half of the length of CD causes a further deviation of the path of point D from a true straight line with the deviation increasing as A'B' is decreased in length.

In all of the foregoing known mechanisms shown in FIGS. 1 to 3, the link 6 or 6' crosses over the link 2 or 2' at the approximate usable midstroke of the system, which causes structural problems in a three dimensional mechanism which must react transverse loads, i.e., loads which are perpendicular to the plane of the two dimensional drawings of FIGS. 1 to 3.

Figure 4:
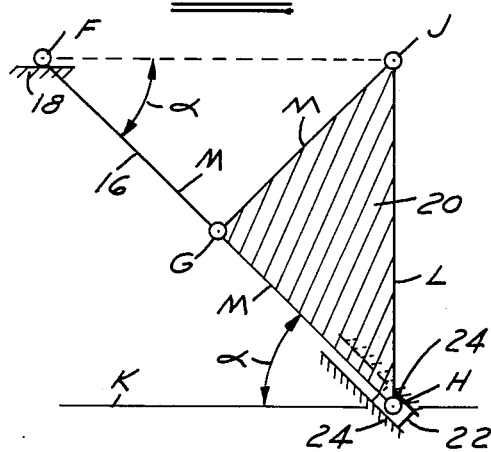
FIG. 4 is a schematic drawing of this invention shown in the reference position.

The mechanism of this invention, which circumvents the link crossover condition, is shown schematically in FIG. 4. The mechanism is shown in its "reference position", which is not necessarily its midstroke position, as will become clear. A link 16 is connected at its one end to the frame 18 through a pivot point F; at its other end the link 16 is connected through a pivot point G to a triangular "body" 20. A pivot point H on the body 20 represents its connection to a slider block 22 operating in guides 24 mounted on the frame 18.

A generating point J on the body 20 will move along a true straight line path, which is along a line connecting points F and J, if the following "Geometric Requirements" are met:
1. The distances on the body 20 from G to H and from G to J are equal to the distances from F to G on link 16; and
2. In the reference position of the mechanism, in which the points F, G, and H are colinear, the axis of the guides 24 or "reference axis" is also colinear with the line FGH; and
3. In the aforesaid reference position of the mechanism, the line FJ is perpendicular to the line JH.

The term "body" is used for the element 20 to indicate the non-colinearity of points J, G and H. The term "bellcrank" could be used with equal accuracy for this element 20.

In the reference position of FIG. 4, the following lengths and angles are defined:
L = distance between points J and H on body 20;
M = the common distance between points F and G on link 16; between points G and J on body 20; and between points G and H also on body 20;
α = the angle between the reference axis (line FGH) and the lines FJ which is the hypothesized path of point J.

A line K is constructed through point H, in the reference position, parallel to line FJ. The angle between line K and the reference axis, line FGH, which is also the axis of the slide block guides 24, is then also equal to α. L is defined as being perpendicular to FJ; L is therefore also perpendicular to line K, and L is the distance beteen line FJ and line K. It can be seen that:

$$L = 2M\sin\alpha \quad (1)$$

$$M = \frac{L}{2\sin\alpha}$$

Figure 5:
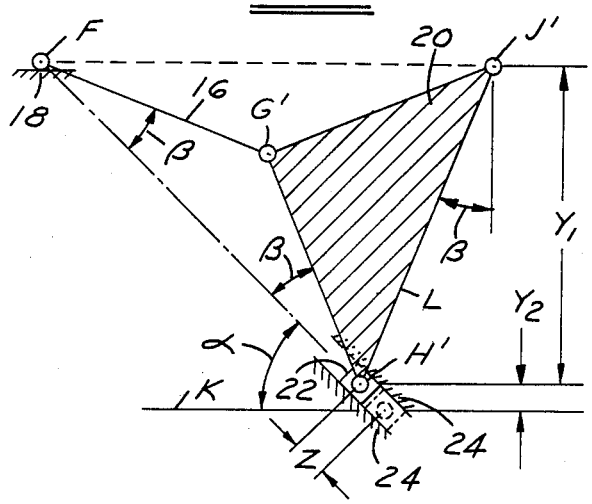
FIG. 5 is a schematic drawing of this invention shown in a displaced position from FIG. 4.

In FIG. 5, the link 16 has been rotated through some arbitrary angle $\beta$ from the reference position of FIG. 4 with the new positions designated by ('). Since FG' = G'H' = M, the triangle FG'H' is isosceles, and the angle between G'H' and the reference axis (FH') is also $\beta$. Therefore, the body 20 has also rotated through an angle $\beta$ from the reference axis. The perpendicular distance of point J', the new position of point J, from line K is given by $Y_1 + Y_2$; and the distance moved by point H to H' along the reference axis is given by Z. It can be seen that:

$$Y_1 = L\cos\beta \quad (2)$$

$$Z = 2M - 2M\cos\beta \quad (3)$$

$$Y_2 = Z\sin\alpha \quad (4)$$

Substituting (3) into (4)

$$Y_2 = 2M(1 - \cos\beta)\sin\alpha \quad (5)$$

Substituting (1) into (5)

$$Y_2 = \frac{2L}{2\sin\alpha}(1 - \cos\beta)\sin\alpha \quad (6)$$

-continued $$Y_2 = L(1 - \cos\beta)$$

Combining (1) and (6)

$$Y_1 + Y_2 = L\cos\beta + L(1 - \cos\beta)$$

Clearing:

$$Y_1 + Y_2 = L$$

Therefore, the distance of point J' from the line K remains constant, with a value of L, independent of the angle of movement, $\beta$, and independent of the original defined angle of the guide axis, α. Since the line K was constructed parallel to line FJ of FIG. 4, this proves that the path of point J always lies on the true straight line FJ, or extension thereof.

As noted above, the mechanism schematically portrayed in FIG. 4 is shown in the reference position, with points F, G and H colinear and defining the reference axis. From this shown position, it is possible for the point J to be moved to the right along an extension of the line FJ, until the points F, G and J become colinear; this defines the rightmost position attainable by point J. Given the constraint from the real mechanism that the link 16 and the body 20 do not crossover, it can be seen that the extreme leftmost position attainable by point J will be short of the point F by the physical widths of the link 16 and body 20 at the pivot points F and J. From the position shown in FIG. 4, it can be seen that, within the above-described limits, the point J can move further to the left than it can to the right and that the midstroke position of the mechanism does not coincide with the defined reference position.

From the mathematical proof for the straightness of the path of point J, it was noted that the mechanism described a straight path for point J independent of the value of angle α; i.e., the angle α could be varied to suit mechanical design convenience. Two such schematic mechanisms utilizing different values of angle α are graphically depicted in FIGS. 6 and 7.

Figure 6:
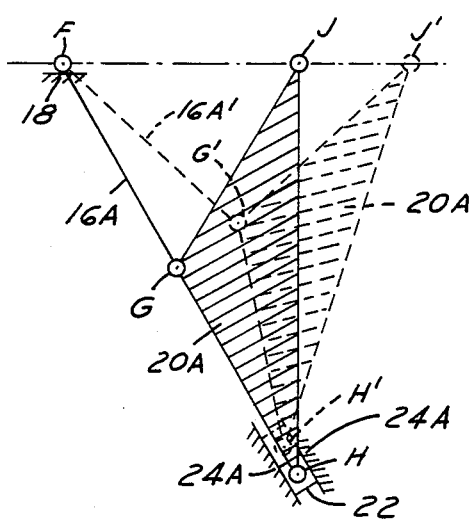
FIG. 6 is a schematic drawing of a differently proportioned embodiment of this invention showing the linkage in solid lines for the reference position and in dotted lines for a displaced position.

Whereas the angle α in FIG. 4 is shown as 45°, in FIG. 6 it has been arbitrarily increased in FIG. 6 to 60°. The reference position of the element is shown in solid lines; a link 16A is pivotally connected to the frame 18 at pivot point F. At its other end the link 16A is pivotally connected to a body 20A, at pivot point G. At point H on the body 20A, constructed as previously described, the body is pivotally connected to a slide block 22 operating in guides 24A colinear with the reference axis through points F, G and H. Point J on the body 20A, again constructed as previously described, is the point which moves in a true straight line. This is graphically shown by the elements shown in dashed lines and having prime labels (') after the link 16A has been rotated through some angle about point F to a new position 16A'. It is graphically clear that the point J moves in a straight line from point J to J'.

Figure 7:
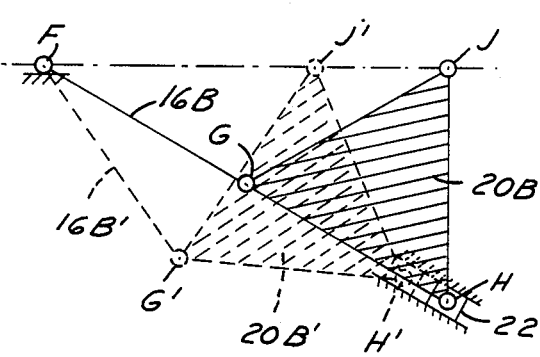
FIG. 7 is a schematic drawing of a second differently proportioned embodiment of this invention showing the linkage in solid lines for the reference position and in dotted lines for a displaced position.

In FIG. 7, the angle α has been reduced to 30°. The link 16B and body 20B are again shown in solid lines in their reference position, and by dashed lines and primed labels after the link 16B has been rotated through some angle to its new position 16B'. This angle of rotation is in the opposite direction from that shown in FIGS. 5 and 6, but it is still graphically evident that the point J moves in a straight line to its new position J'.

A representative mechanism incorporating two schematic linkages, as previously described, is shown in FIGS. 8, 9, 10 and 11. Referring to these figures, a base 30 supports a column 32 on which are mounted two pairs of extensions 34 and 36. A shaft 38 is journalled in the extensions 34, and corresponds to the pivot point F in the schematic diagrams. A link 40 is mounted at its one end on shaft 38; at its other end the link 40 is connected to a bellcrank 42 through a shaft 44 journalled in the bellcrank 42. The shaft 44 corresponds to point G, and bellcrank 42 corresponds to body 20 in the schematic drawings. One end of bellcrank 42 carries a shaft 46 pivotally connected to two slider blocks 48 operating in guides 50 and 52 mounted on a base extension 54; the shaft 46 corresponds to pivot H of the schematic drawings. A shaft 56 mounted in the other end of bellcrank 42 is journalled in extensions 58 in a carriage 60; and shaft 56 corresponds to point J of the schematic diagrams. The distance from shaft 38 to shaft 44 in link 40 is identical with the distance, in bellcrank 42, from shaft 44 to shaft 46 and the distance from shaft 44 to shaft 56.

The assembly made up of link 40 and bellcrank 42 are shown in their midstroke position, as opposed to their reference position. It will be understood that when these elements are in their reference position, with shafts 38, 44 and 46 colinear, they are also colinear with the axis established by guides 50 and 52. In this same reference position, the line of centers from shaft 38 to shaft 56 is perpendicular to the line of centers from shaft 56 to shaft 46. The linkage therefore meets all of the "Geometric Requirements" previously described in connection with FIGS. 4 to 7 and the shaft 56 moves along a straight path which is along the line connecting shafts 38 and 56.

On the other side of the column 32, and acting between the extensions 36, the base 30, and the carriage 60, is mounted a duplicate linkage assembly; this linkage is mounted in a symmetrically opposite or mirror image arrangement, and each corresponding element is labeled with a "5" suffix. It can be seen therefore that the shaft 565, by which the carriage 60 is supported from bellcrank 425, will also move in a straight line which is colinear with the path of shaft 56. Since the carriage 60 is supported by the two shafts 56 and 565, each of which moves in a colinear straight line, it too moves in a straight line along its own axis.

As noted earlier, the linkages are shown in their midstroke position by the solid lines. Superimposed on FIG. 8 in dashed lines is a position drawing showing the linkages and carriage in their extreme rightmost travel position; for clarity the position of the linkages in their extreme leftmost position is not shown, but it will be understood that this position would show the linkages symmetrically opposite from their rightmost position.

The overall mechanism shown in FIG. 8 illustrates a means of supporting a carriage 60 from a base 30 for linear movement using non-crossover linkages. Means for causing this movement are not shown since this depends on the application. Among the many means available for powering such movement are a cylinder mounted on the base and having its output road connected to the carriage; a lead screw drive mounted on the base with the nut mounted on the carriage. Alternately, a torque applying member can be connected to shaft 38 or 385 whereby the carriage is driven by a powered rotation of link 40 or 405.

Since the link 40 and bellcrank 42 need not cross over each other, they may be physically wide relative to their length as is clear from FIGS. 9 and 10. Furthermore, it is possible to use wide spans between journals on any given pivot shaft. This provides an overall physical system which is very stable in a direction transverse to the direction of movement and capable of reacting side loads of considerable magnitude in this transverse direction; such loads cannot be reacted by linkage systems in which the links cross over each other as part of their movement pattern.

If the carriage 60 were longer than as shown in FIG. 8, it is clear that additional support and guidance linkages could be utilized; these could be identical with the linkage 40 and 42 as shown or the mirror image embodiment of linkage 405 and 425.

While the schematic linkages described in FIGS. 4-7, and the physical linkage shown in FIGS. 8-11, generate true straight lines, it is possible to modify the system, eliminating the slider block guides, and still generate a very close approximation to a straight line. Two such modifications are shown in FIGS. 12 and 13.

Referring to FIG. 12, the link 16 is again pivotally connected to the frame 18 through pivot point F, and at its other end the link 16 is pivotally connected to the body 20 through pivot point G, as before. The point H on the body is pivotally connected to the midpoint of an intermediate link 70; at its one end, the link 70 is pivotally connected at point N to a link 72 whose other end is pivotally connected to the frame 18 at point R. At its other end, the link 70 is pivotally connected at point P to a link 74 whose other end is pivotally connected to the frame 18 at point Q. The linkage comprised of links 70, 72 and 74 will be recognized as a conventional and well-known Watt's Linkage, in which the point H moves in a very close approximation to a straight line over the center portion of its travel.

In the embodiment of FIG. 12, this Watt's Linkage, comprised of links 70, 72 and 74, is used as a replacement for the sliding block 22 of the earlier systems. Therefore, if the approximate straight line path generated by point H is replaced by a true straight line, that straight line should intersect the point F; this straight line is the "reference axis" as previously defined. Then when point G lies on this reference axis (the reference position), the line FJ is perpendicular to the line JH. As before, the distances GJ and GH on body 20 are equal to distance FG on link 16. The path of point J will be an extremely close approximation of a true straight line.

The schematic embodiment shown in FIG. 13 is substantially identical with the embodiments of FIG. 12 and FIG. 4 except for the method by which point H is guided along the reference axis. In this instance (FIG. 13), the point H is guided by a simple link 76 pivoted to the frame 18 at point S. The path described by point H is therefore a true arc, chosen to minimize the deviation from the reference axis. Obviously, the longer the link 76, the more closely the arc approximates the straight line of the reference axis, and the angle between the reference axis and the line HS should be 90° at the approximate middle of the excursion of point H. It may be seen that the relationship of the linkage of FIG. 13 to the linkage of FIG. 4 is an analog of the relationship of the linkage of FIG. 2 to the linkage of FIG. 1. The path of point J will be a good approximation of a straight line, but less perfect than that attainable with the linkage of FIG. 12.

Whereas in all the previous embodiments the distances between points J and G and G and H on body 20 were identical with the distance between points F and G on link 16, these distances may also be modified, generally for mechanical convenience, with a slight increase in the deviation of the path of point J from a true straight line. Such a linkage is shown schematically in FIG. 14 by the solid lines. In this embodiment, the pivot connection between the link 16' and the frame 18, designated as F' is below the approximate straight line path of point J on the body 20'. As a reference, the ideal position of the pivot point F is shown in dotted lines, and the ideal position of the pivot point between the link and body is shown as G. The distances JG, GH and FG are all equal. By lowering F to F' as shown, it becomes necessary to shift G to G' as shown. A very good approximation to a straight line for the travel of point J is achieved if the following length ratios are substantially achieved:

$$\frac{F'G'}{G'H} = \frac{G'H}{G'F} \quad (7)$$

Since the length G'F relates to a non-existent point on the actual linkage, it is desirable to define this length in terms of the actual linkage. From the previous embodiments, it will be recalled that $$FH = 2GJ \quad (8)$$

In FIG. 14, moving point G to G' causes a negligible change in the length of GJ; therefore, $$GJ \cong G'J \quad (9)$$

Substituting (8) in (9)

$$FH = 2G'J \quad (10)$$

From FIG. 14

$$FH = G'F + G'H \quad (11)$$

Combining (10) and (11)

$$G'F + G'H = 2G'J \quad (12)$$

or $$G'F = 2G'J - G'H \quad (13)$$

Substituting (13) into (7)

$$\frac{F'G'}{G'H} = \frac{G'H}{2G'J - G'H} \quad (14)$$

The lengths in equation (14) all relate to the actual lengths in the true mechanism of FIG. 14.

This is a good approximate relationship, but the exact ratio is dependent on the type of error from a true straight line which is most acceptable from the application requirements; i.e., should the error be primarily above the target straight line, or should it be primarily below the target straight line, or should it oscillate equally about the target straight line. This can be determined either by geometrical or analytical methods, depending on the accuracy required. It is again evident that the modifications made in the linkage of FIG. 14 relative to the ideal linkage of FIG. 4 are analogous to the modifications made in the linkage of FIG. 3 relative to the ideal linkage of FIG. 1.

In the embodiment of FIGS. 4 and 5, in which the output is a mathematically perfect true straight line, this perfection can only be achieved if the "Geometric Requirements" are perfectly met. However, in the other embodiments of FIGS. 12, 13 and 14 in which some of the "Geometric Requirements" are slightly modified, it is also possible to modify the other "Geometric Requirements" to modify the type of error created. For example, in the embodiment of FIG. 13, the path of point J is already an imperfect straight line due to the slightly curved path of point H. It may therefore be advantageous to modify slightly the equality of lengths FG, GJ and GH to control the type of error generated at point J.

We claim:

1. A mechanical linkage system having a pivot point output connection which moves along a true straight output path, comprising:
   (a) a supporting frame,
   (b) a first link member containing a first pivot point connecting said first link member to said frame and a second pivot point displaced from said first pivot point by a first distance,
   (c) a rigid bellcrank member containing three non-colinear pivot points, comprising:
   (1) a center pivot point connected to said second pivot point on said first link member,
   (2) a guide pivot point separated from said center pivot point by a equal to said first distance,
   (3) an output pivot point separated from said center pivot point by a distance also equal to said first distance, and
   (d) means for guiding said guide pivot point along a true straight line along a reference axis, where said reference axis is a straight line defined by a specific reference position of said linkage in which said first and second pivot points on said first link member and said guide pivot point on said bellcrank member are colinear and lie on said reference axis, and, when said linkage is in the aforesaid reference position, a line drawn from said guide pivot point to said output pivot point is perpendicular to a line drawn from said first pivot point to said output pivot point.

2. A mechanical linkage system as in claim 1 in which said means for guiding comprises a slider block, which operates in guide members mounted on said frame to guide said guide pivot point exactly along said reference axis 3. A mechanical linkage system as in claim 1 in which the linkage system for generating the straight output path is constructed such that the centerline connecting said first pivot point and said center pivot point does not cross over the centerline connecting said center pivot point and said output pivot point.

4. A mechanical linkage system having a pivot point output connection which moves along a substantially straight output path, comprising:
   (a) a supporting frame,
   (b) a first link member containing a first pivot point connecting said first link member to said frame and a second pivot point displaced from said first pivot point by a first distance,
   (c) a rigid bellcrank member containing three non-colinear pivot points, comprising:
   (1) a center pivot point connected to said second pivot point on said first link member,
   (2) a guide pivot point separated from said center pivot point by a second distance, and (3) an output pivot point separated from said center pivot point by a third distance, and (d) means for guiding said guide pivot point along a substantially straight line along a reference axis, where said reference axis is a straight line defined by a specific reference position of said linkage in which said first and second pivot points on said first link member and said guide pivot point on said bellcrank member are colinear and lie on said reference axis, and said first distance, said second distance, and said third distance are substantially identical in length; and, when said linkage is in the aforesaid reference position, a line drawn from said guide pivot point to said output pivot point is substantially perpendicular to a line drawn from said first pivot point to said output pivot point, (e) said means for guiding comprising an auxiliary link pivotally connected at its one end to said guiding pivot point and pivotally connected at its other end to said frame, with the line between said pivot points on said auxiliary link substantially perpendicular to said reference axis when said guide pivot point is approximately at the midpoint of its travel range.

5. A mechanical linkage system having a pivot point output connection which moves along a substantially straight output path, comprising:

(a) a supporting frame, (b) a first link member containing a first pivot point connecting said first link member to said frame and a second pivot point displaced from said first pivot point by a first distance, (c) a rigid bellcrank member containing three non-colinear pivot points, comprising:

(1) a center pivot point connected to said second pivot point on said first link member, (2) a guide pivot point separated from said center pivot point by a distance equal to said first distance, (3) an output pivot point separated from said center pivot point by a distance also equal to said first distance, (d) means for guiding said guide pivot point along a substantially straight line along a reference axis, where said reference axis is a straight line defined by a specific reference position of said linkage in which said first and second pivot points on said first link member and said guide pivot point on said bellcrank member are colinear and lie on said reference axis, and, when said linkage is in the aforesaid reference position, a line drawn from said guide pivot point to said output pivot point is substantially perpendicular to a line drawn from said first pivot point to said output pivot point.

6. A mechanical linkage as in claim 5 in which said means for guiding comprises an auxiliary Watt's Straight Line Linkage.

7. A mechanical linkage as in claim 5 in which said means for guiding comprises an auxiliary link pivotally connected at its one end to said guiding pivot point and pivotally connected at its other end to said frame, with the line between said pivot points on said auxiliary link substantially perpendicular to said reference axis when said guide pivot point is at a predetermined point in its travel range, and the greater the length between said pivot points on said auxiliary link, the more nearly a true straight line becomes the path of said output point.

8. A mechanical linkage as in claim 9 in which the linkage system for generating the substantially straight output path is constructed such that the centerline connecting said first pivot point and said center pivot point does not cross over the centerline connecting said center point and said output pivot point.

* * * * *

UNITED STATES PATENT AND TRADEMARK OFFICE
CERTIFICATE OF CORRECTION

PATENT NO. : 4,545,266
DATED : October 8, 1985
INVENTOR(S) : John Henry Brems

It is certified that error appears in the above-identified patent and that said Letters Patent are hereby corrected as shown below:

Col. 8, Line 28, after "a" insert -- distance --.

Col. 10, Line 31, change "claim 9" to -- claim 5 --.

Signed and Sealed this

Thirty-first Day of December 1985

[SEAL]

Attest:

DONALD J. QUIGG

Attesting Officer

Commissioner of Patents and Trademarks